United States Patent
Lei et al.

(10) Patent No.: US 10,021,700 B2
(45) Date of Patent: Jul. 10, 2018

(54) METHOD FOR UPLINK-DOWNLINK INTERFERENCE MITIGATION IN HETEROGENEOUS NETWORK

(75) Inventors: Haipeng Lei, Beijing (CN); Kodo Shu, Beijing (CN); Yuanrong Lan, Beijing (CN); Chunhai Yao, Beijing (CN); Jiezhen Lin, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/400,427

(22) PCT Filed: May 11, 2012

(86) PCT No.: PCT/CN2012/075370
§ 371 (c)(1),
(2), (4) Date: Nov. 11, 2014

(87) PCT Pub. No.: WO2013/166712
PCT Pub. Date: Nov. 14, 2013

(65) Prior Publication Data
US 2015/0163815 A1    Jun. 11, 2015

(51) Int. Cl.
*H04W 72/08* (2009.01)
*H04W 16/10* (2009.01)
(Continued)

(52) U.S. Cl.
CPC ............ *H04W 72/082* (2013.01); *H04L 5/14* (2013.01); *H04W 16/10* (2013.01);
(Continued)

(58) Field of Classification Search
CPC ........ H04L 5/14; H04W 16/08; H04W 16/10; H04W 72/0486; H04W 72/082
(Continued)

(56) References Cited

U.S. PATENT DOCUMENTS 6,421,544 B1 * 7/2002 Sawada ............... H04M 1/663
                                                              455/418
8,644,273 B2    2/2014 Choi et al.
(Continued)

FOREIGN PATENT DOCUMENTS

CN    102036295 A    4/2011
CN    102036296 A    4/2011
(Continued)

OTHER PUBLICATIONS

Notice to File a Response (preliminary rejection) dated Feb. 11, 2016 corresponding to Korean Patent Application No. 10-2014-7034716 and English translation thereof.
(Continued)

*Primary Examiner* — Stephen J Clawson
(74) *Attorney, Agent, or Firm* — Squire Patton Boggs (US) LLP

(57) ABSTRACT

Communication systems, such as the long term evolution (LTE) advanced (LTE-A) of the third generation partnership project (3 GPP) may benefit from various enhancements. These enhancements can include LTE time division duplex (TDD) enhancements for traffic adaptation and uplink (UL)-downlink (DL) interference management. A method can include determining whether a first cell, in a network including the first cell and a second cell, autonomously selects a time division duplex uplink-downlink configuration. The method can also include sending an authority indicator to a base station of the first cell regarding a determination of whether the first cell is to autonomously select the configuration.

6 Claims, 6 Drawing Sheets

(51) Int. Cl.
*H04L 5/14* (2006.01)
*H04W 72/04* (2009.01)
*H04W 16/08* (2009.01)
*H04W 16/32* (2009.01)

(52) U.S. Cl.
CPC ........ *H04W 72/0486* (2013.01); *H04W 16/08* (2013.01); *H04W 16/32* (2013.01)

(58) Field of Classification Search
USPC ........................................................ 370/280
See application file for complete search history.

(56) References Cited

U.S. PATENT DOCUMENTS

| | | | |
|---|---|---|---|
| 2002/0055360 A1* | 5/2002 | Chen | H04W 16/00 455/452.2 |
| 2009/0010228 A1* | 1/2009 | Wang | H04B 1/7105 370/335 |
| 2010/0097965 A1* | 4/2010 | Kwon | H04L 5/14 370/294 |
| 2010/0220597 A1 | 9/2010 | Ji | |
| 2011/0002314 A1* | 1/2011 | Choi | H04W 72/0453 370/338 |
| 2013/0272170 A1* | 10/2013 | Chatterjee | H04W 28/02 370/280 |

FOREIGN PATENT DOCUMENTS

| | | |
|---|---|---|
| KR | 10-2010-0044666 A | 4/2010 |
| KR | 10-2012-0032552 A | 4/2012 |
| WO | 2011/003008 A2 | 1/2011 |
| WO | WO 2011/018722 A1 | 2/2011 |
| WO | WO 2013/100581 A1 | 7/2013 |

OTHER PUBLICATIONS

Extended European Search Report dated Dec. 23, 2015 corresponding to European Patent Application No. 12876124.4.
New Postcom, "Need and feasability of using different uplink-downlink configurations for TDD HeNBs in Heterogeneous Networks," 3GPP TSG RAN WG1 Meeting #61bis, 3GPP Draft; R1-103688, Dresden, Germany, Jun. 28-Jul. 2, 2010, retrieved on Jun. 22, 2010, XP050648390, 6 pages.
International Search Report and Written Opinion dated Feb. 7, 2013 corresponding to International Patent Application No. PCT/CN2012/075370.
Korean Office Action issued in corresponding Korean Application No. 10-2014-7034716 dated Dec. 27, 2016.
Japanese Office Action issued in corresponding Japanese Application No. 2015-510603 dated Feb. 6, 2017.
Chinese Office Action issued in corresponding Chinese Patent Application No. 2012800746069 dated Jul. 26, 2017.

* cited by examiner

| UL/DL Configuration | Switching-point Periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

RELATED ART

Figure 1

METHOD FOR UPLINK-DOWNLINK INTERFERENCE MITIGATION IN HETEROGENEOUS NETWORK

BACKGROUND

Field

Communication systems, such as the long term evolution (LTE) advanced (LTE-A) of the third generation partnership project (3GPP) may benefit from various enhancements. These enhancements can include LTE time division duplex (TDD) enhancements for traffic adaptation and uplink (UL)-downlink (DL) interference management.

Description of the Related Art

Currently, LTE TDD allows for asymmetric UL-DL allocations by providing seven different semi-statically configured TDD UL-DL configurations shown in FIG. 1. These allocations can provide between 40% and 90% DL subframes. The current mechanism for adapting UL-DL allocation is based on the system information change procedure with a 640 ms period. The concrete TDD UL/DL configuration is semi-statically informed by system information block, type 1 (SIB-1) signaling.

As shown in FIG. 1, the various UL-DL allocations can have either 5 ms or 10 ms switching point periodicity. Moreover, the allocations can include allocations for downlink, D, uplink U, and special S. The special subframes can be, for example, a guard period.

If dynamic TDD UL/DL reconfiguration is directly adopted in LTE systems including both homogeneous networks and heterogeneous networks, it may cause UL-DL interference in the conflicting subframes, due to independent and different TDD UL/DL configurations in neighboring cells, such as eNode B (eNB)-to-eNB interference and user equipment (UE)-to-UE interference. This kind of UL-DL interference can impact UL signal to interference plus noise ratio (SINR) when the eNBs are located in line of sight (LOS) or located close to each other or on DL SINK when the UEs are located at the edge of a cell.

Considering the impact of UL-DL interference, dynamic TDD UL/DL reconfiguration is mainly adopted in small cells, for example, pico cells, Femto cells, and LTE-Hi cells. As shown in FIG. 2, two small cells, cell 1 and cell 2, in the coverage of a macro cell can use a dynamic TDD UL/DL reconfiguration feature according to each cell's own uplink-downlink traffic variation while the macro cell uses a fixed TDD UL/DL configuration to avoid UL-DL interference in wide area network.

In this case, UE1 in DL served by a base station (BS) of cell 1 may receive interference from UE2 in the neighboring cell due to the uplink transmission of UE2. Likewise, UE2 in UL served by a BS of cell 2 may receive interference from BS of cell 1, due to the downlink transmission of Cell 1. In particular, when UE1 is located near UE2, interference may be greater between the two UEs. Similarly, when the two cells are located in LOS or close to each other, BS-to-BS interference may be greater between two BSs.

Currently, in real deployment, all the neighboring cells use the same TDD UL/DL configuration and thereby avoid the UL-DL interference explained above. Dynamically changing TDD UL/DL configuration brings new inter-cell interference scenarios such as eNB-to-eNB and UE-to-UE. So there is no specific conventional interference mitigation scheme with respect to this UL-DL interference.

SUMMARY

According to certain embodiments, a method includes determining whether a smaller cell, in a network including the smaller cell and a larger cell, autonomously selects a time division duplex uplink-downlink configuration. The method also includes sending an authority indicator to a base station of the smaller cell regarding a determination of whether the smaller cell is to autonomously select the configuration.

In certain embodiments, a method includes determining, based on information from a base station of a larger cell, whether a smaller cell is to control a time division duplex uplink-downlink configuration. The method also includes applying a selected time division duplex uplink-downlink configuration based on the information.

A method, according to certain embodiments, includes receiving a time division duplex uplink-downlink configuration from a second cell at a first cell. The method also includes determining whether to optimize a time division duplex uplink-downlink configuration of the first cell for an expected load or to avoid interference, based on potential interference with the second cell.

According to certain embodiments, an apparatus includes at least one processor and at least one memory including computer program code. The at least one memory and the computer program code are configured to, with the at least one processor, caused the apparatus at least to determine whether a smaller cell, in a network including the smaller cell and a larger cell, autonomously selects a time division duplex uplink-downlink configuration. The at least one memory and the computer program code are also configured to, with the at least one processor, caused the apparatus at least to send an authority indicator to a base station of the smaller cell regarding a determination of whether the smaller cell is to autonomously select the configuration.

In certain embodiments, an apparatus includes at least one processor and at least one memory including computer program code. The at least one memory and the computer program code are configured to, with the at least one processor, caused the apparatus at least to determine, based on information from a base station of a larger cell, whether a smaller cell is to control a time division duplex uplink-downlink configuration. The at least one memory and the computer program code are also configured to, with the at least one processor, caused the apparatus at least to apply a selected time division duplex uplink-downlink configuration based on the information.

An apparatus, according to certain embodiments, includes at least one processor and at least one memory including computer program code. The at least one memory and the computer program code are configured to, with the at least one processor, caused the apparatus at least to receive a time division duplex uplink-downlink configuration from a second cell at a first cell. The at least one memory and the computer program code are also configured to, with the at least one processor, caused the apparatus at least to determine whether to optimize a time division duplex uplink-downlink configuration of the first cell for an expected load or to avoid interference, based on potential interference with the second cell.

An apparatus, in certain embodiments, includes determining means for determining whether a smaller cell, in a network including the smaller cell and a larger cell, autonomously selects a time division duplex uplink-downlink configuration. The apparatus also includes sending means for sending an authority indicator to a base station of the smaller cell regarding a determination of whether the smaller cell is to autonomously select the configuration.

According to certain embodiments, an apparatus includes determining means for determining, based on information from a base station of a larger cell, whether a smaller cell is to control a time division duplex uplink-downlink configuration. The apparatus also includes applying means for applying a selected time division duplex uplink-downlink configuration based on the information.

In certain embodiments, an apparatus includes receiving means for receiving a time division duplex uplink-downlink configuration from a second cell at a first cell. The apparatus also includes determining means for determining whether to optimize a time division duplex uplink-downlink configuration of the first cell for an expected load or to avoid interference, based on potential interference with the second cell.

A non-transitory computer readable medium, according to certain embodiments, is encoded with instructions that, when executed in hardware, perform a process. The process includes determining whether a smaller cell, in a network including the smaller cell and a larger cell, autonomously selects a time division duplex uplink-downlink configuration.

A non-transitory computer readable medium, in certain embodiments, is encoded with instructions that, when executed in hardware, perform a process. The process includes determining, based on information from a base station of a larger cell, whether a smaller cell is to control a time division duplex uplink-downlink configuration. The process also includes applying a selected time division duplex uplink-downlink configuration based on the information.

According to certain embodiments, a non-transitory computer readable medium is encoded with instructions that, when executed in hardware, perform a process. The process includes receiving a time division duplex uplink-downlink configuration from a second cell at a first cell. The process also includes determining whether to optimize a time division duplex uplink-downlink configuration of the first cell for an expected load or to avoid interference, based on potential interference with the second cell.

BRIEF DESCRIPTION OF THE DRAWINGS

For proper understanding of the invention, reference should be made to the accompanying drawings, wherein:

FIG. 1 illustrates seven current kinds of TDD UL/DL configurations.

DETAILED DESCRIPTION

Figure 2:
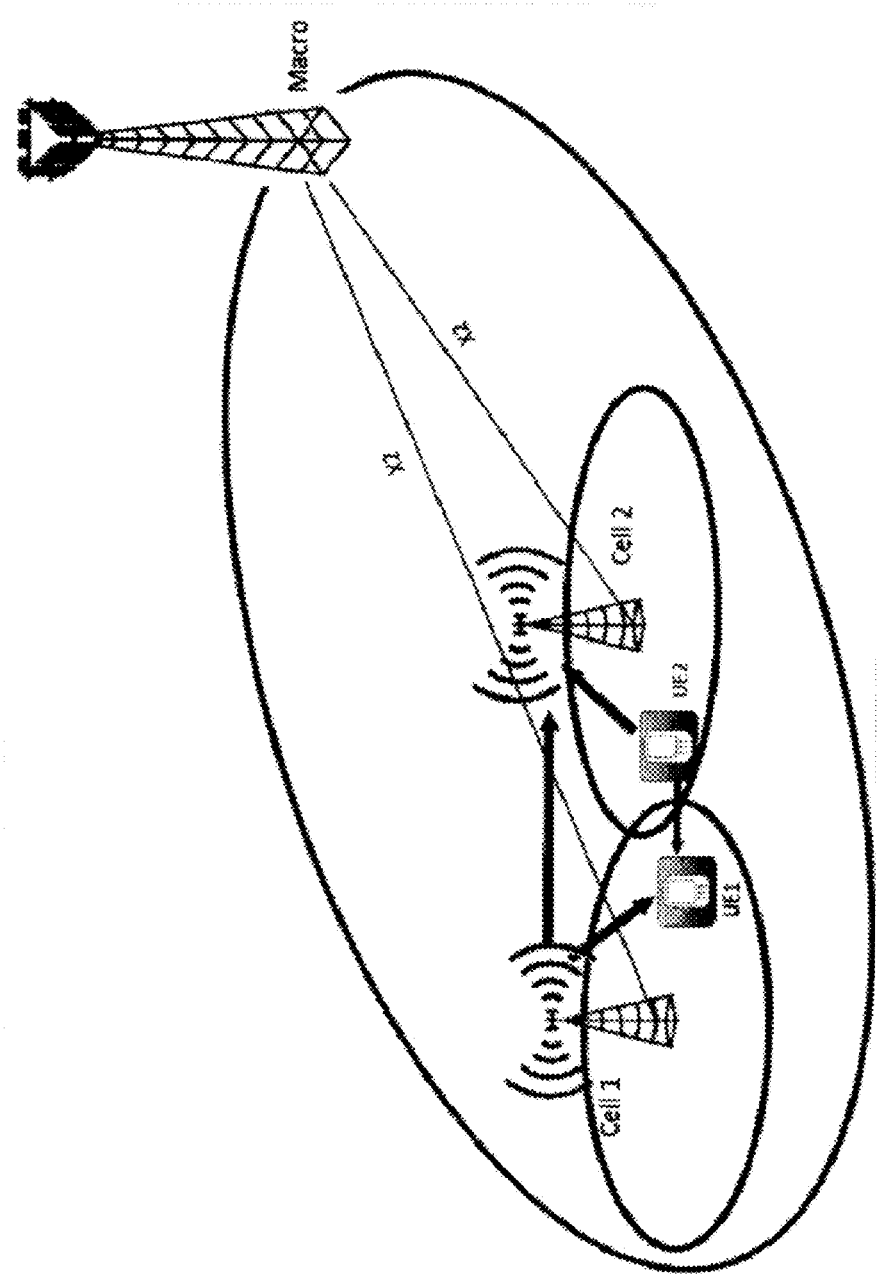
FIG. 2 illustrates dynamic TDD UL/DL reconfiguration in a heterogeneous network.

Certain embodiments provide for dynamic time division duplex (TDD) uplink (UL)/downlink (DL) reconfiguration. More specifically, certain embodiments realize the flexibility to have dynamic TDD UL/DL configuration in a TDD system to match the uplink and downlink traffic variation. Moreover, certain embodiments avoid having a negative impact of the UL-DL interference.

For example, certain embodiments can avoid or reduce UL and DL interference when two small cells, such as a pico cells or femto cells, in the coverage of a macro cell use flexible TDD UL/DL reconfiguration.

In certain embodiments, for example, a base station or eNode B (eNB) of a macro cell can send an authority indicator to a pico cell. The pico cell can send traffic load information to the eNB of the macro cell. The traffic load information can include the instantaneous traffic ratio between DL and UL, or the amount of data available waiting for scheduling in DL and UL, or the traffic ratio during predefined statistic time scale. The macro eNB can select a TDD UL/DL configuration for the pico cell with a relatively small number of conflicting subframes, based on both interference information, such as path loss, and traffic load information.

Thus, for example, a macro eNB can determine who has authority to control the pica's TDD DL/UL configurations based on interference conditions between two picos. The macro can determine that one or both of the picos can have autonomous control, or the macro can determine that the macro has control.

For instance, if interference is low, such as when the two picos are located far away each other, then macro can send an authority indicator to the pico and the pico can determine its own TDD DL/UL configurations.

On the other hand, if interference is high, such as when two picos are located close to each other, then the macro can determine an appropriate TDD DL/UL configuration for the pico and send it to the pico.

The pico eNB can send traffic information to the macro, which can serve as the basis for the macro's decision about authority. For example, the pico can send an instantaneous traffic ratio between DL and UL, the pico can send an indication of an amount of data available waiting for scheduling in DL and UL, or the pico can send a traffic ratio during a predefined statistic time scale.

The macro eNB can select a TDD UL/DL configuration for the pico cell with fewer conflicting subframes based on an interference table, a reported ratio between downlink and uplink, or a traffic amount waiting for the scheduling at the pico eNB. For example, the macro's selection routine can be configured to minimize the number of conflicting subframes.

Thus, certain embodiments provide a method of semi-autonomous TDD configuration management, wherein the macro eNB (MeNB) can determine whether an inter-cell interference between two PeNBs exceeds a threshold for at least one of the PeNBs and can control at least one of the PeNB's TDD configuration when the threshold is exceeded, while allowing autonomous TDD configuration by each of the PeNBs when the threshold is not exceeded.

Thus, certain embodiments provide a macro eNB-controlled dynamic TDD UL/DL configuration scheme for small cells associated with the macro eNB. The scheme is mostly targeting at UL-DL interference coordination in heterogeneous network scenario where macro and small cells operate on different carriers.

For example, the macro eNB knows the location of each associated pico cell, for example those pico cells within or nearby the coverage area of the macro cell. The macro eNB can also know the pathloss between neighboring pico cells. This pathloss information may be calculated by the macro, collected directly by small cells which with additional DL receiving capabilities, obtained by a practical field test after deployment, or obtained any other way. The macro eNB can compare anticipated interference with a threshold to decide whether two pico eNBs deployed in neighboring cells cause severe interference to each other. Moreover, the macro eNB can maintain tables recording the pico cells that may have severe interference to or from each specific pico cell. The threshold used by the macro eNB may be adjusted to keep the UL-DL interference within a predetermined margin of a target level.

The macro eNB can look up the interference table and send the authority indication to each pico eNB, using, for example, X2 or S1 interface signaling. The macro eNB can transfer the authority of determining TDD UL/DL configuration to the pico cell that meets the condition that no other pico cell is recorded in the interfered table of this pico cell. Otherwise, the authority can be kept at the macro eNB.

If a pico eNB has the authority of determining TDD UL/DL configuration then the pico eNB can autonomously change its TDD UL/DL configuration according to its own instantaneous traffic ratio between DL and UL or the amount of data available waiting for scheduling in DL and UL or the traffic ratio during predefined statistic time scale.

If a pico eNB has no authority to determine its own TDD UL/DL configuration, the pico eNB can send the instantaneous traffic ratio between DL and UL, the amount of data available waiting for scheduling in DL and UL, or the traffic ratio during predefined statistic time scale to macro eNB. This information can be sent via backhaul signaling, such as X2 or S1 interface signaling. The information can be sent periodically or with triggering.

In the case where the macro eNB has authority, the macro eNB can select the TDD UL/DL configuration for the pico cell by looking up an interference table and considering the TDD UL/DL configuration in the interfered pico cell.

For example, the macro eNB can select a TDD UL/DL configuration with the fewest, or at least less than the most, conflicting subframes. Table 1, discussed below, provides an example. The macro eNB can give consideration of reported ratio between downlink and uplink or traffic amount waiting for scheduling at the pico eNB.

After the TDD UL/DL configuration for a particular pico is determined, the macro eNB can send the configuration to the pico, for example via X2 or S1. Then, the pico can change its TDD UL/DL configuration complying with macro eNB's decision.

Alternatively, a pico eNB without the authority of determining TDD UL/DL configuration can also send the expected TDD UL/DL configuration according to traffic ratio statistic between DL and UL to macro eNB via X2 or S1 interface. Then, the macro eNB can select the TDD UL/DL configuration for pico cell with a small number of conflicting subframes according to Table 1, discussed below, and can take the expected TDD UL/DL configuration by this pico into account.

An alternative approach for macro-pico operated on the same carrier can be as follows. The macro eNB can send its own TDD UL/DL configuration to each pico eNB within its coverage via, for example, X2 or another interface. Then, each pico eNB can implement Table 1, described below, in its own memory and can estimate the pathloss to the macro eNB by listening to a reference signal of the macro eNB.

If pathloss is greater than a threshold plus a margin, which can be referred to as delta, the pico eNB can select the TDD UL/DL configuration according to its own traffic variation in UL and DL.

Otherwise, the pico eNB can select the TDD UL/DL configuration with a relatively small number of conflicting subframes with a macro cell's TDD UL/DL configuration according to Table 1, described below.

Hence, the feature of dynamic TDD reconfiguration can be adopted and avoid severe UL-DL interference. The interference coordination approach described above can also be applied to Femto cells or LTE-Hi cells.

As mentioned above, in a heterogeneous network, a macro cell can use a fixed TDD UL/DL configuration. Dynamic TDD UL/DL reconfiguration, however, can be used in small cells, such as pico cell, Femto cell or LTE-Hi cell. At the start of each TDD configuration switching period, pico eNB, Femto base station or LTE-Hi AP can select a TDD UL/DL configuration with the most appropriate DL-UL subframe ratio. A basis for the selection can be the relative amount of total downlink and uplink traffic waiting for the scheduling at the base station. In this way, DL throughput gain or UL throughput gain or both DL throughput and UL throughput gain can be obtained due to traffic adaptation.

When macro cell and the smaller cells operate on different carriers, there is no co-channel interference between the macro cell and small cells. This scenario may be addressed by certain embodiments.

After deployment of each small cell, the macro eNB may need to know the location of each associated pico within its coverage and the pathloss between neighboring pico cells. This pathloss information may be calculated by macro or collected directly by small cells which with additional DL receiving capabilities. Other ways of obtaining the pathloss information, including a practical field test after deployment, can also be used.

Then the macro eNB can compare the pathloss information with a threshold, to decide whether any two pico eNBs deployed in neighboring cells cause severe interference to each other. If the pathloss between two pico cells is lower than the threshold, then the macro eNB can maintain a table to record the two pico cells. Otherwise, the macro eNB can omit recording the two pico cells as an interference pair. Another alternative is that the macro eNB maintains an interference table to record the mutual interference level between any two pico cells, including both low interference and severe interference, where the difference between low and severe is determined by comparing pathloss with the threshold. This threshold may be adjusted to keep the UL-DL interference at a target level, within a margin.

In use, the macro eNB can look up the interference table and send an authority indication to each pico eNB, for example using an X2 or S1 interface signaling. For example, one bit can be used as the authority indication. In one approach, a bit with value 1 represents that the pico has the authority to determine its own TDD UL/DL configuration, while a bit with value 0 represents that the pico has no such authority and needs to report its traffic variation or traffic ratio in DL and UL to macro and comply with the macro's decision. For a pico cell that meets the condition that no other pico cell is recorded in the interfered table of this pico cell, the macro eNB can transfer the authority of determining TDD UL/DL configuration to the pico cell by setting the authority indication to "1". Otherwise, the macro eNB can keep this authority at macro eNB by set the authority indication to "0".

The pico eNB having the authority of determining TDD UL/DL configuration can autonomously change its TDD UL/DL configuration according to its own instantaneous traffic ratio between DL and UL or the amount of data available waiting for scheduling in DL and UL or the traffic ratio during predefined statistic time scale.

A pico eNB without the authority of determining TDD UL/DL configuration can, periodically or with triggering, send the instantaneous traffic ratio between DL and UL, the amount of data available waiting for scheduling in DL and UL, or the traffic ratio during predefined statistic time scale to the macro eNB via backhaul signaling, for example, via X2 or S1 interface signaling.

The macro eNB can select the TDD UL/DL configuration for this pico cell by looking up the interference pico table and considering the TDD UL/DL configuration in the interfered pico. The macro can select the TDD UL/DL configuration with fewer conflicting subframes to the interfered pico cell according to Table 1, also taking into account a reported ratio between downlink and uplink traffic waiting for the scheduling at the pico cell.

Table 1, below, illustrates a number of conflicting subframes between any two different TDD configurations within a radio frame. A special subframe can be seen as a conflicting subframe with a DL subframe due to UpPTS in the special subframe when calculating the number of conflicting subframes between one TDD UL/DL configuration with 5 ms switching point and another configuration with 10 ms switching point.

TABLE 1

| TDD Configuration in one cell | TDD Configuration in another cell | | | | | | |
|---|---|---|---|---|---|---|---|
| | 0 | 1 | 2 | 3 | 4 | 5 | 6 |
| 0 | 0 | 2 | 4 | 4 | 5 | 6 | 1 |
| 1 | 2 | 0 | 2 | 4 | 3 | 4 | 1 |
| 2 | 4 | 2 | 0 | 4 | 3 | 2 | 3 |
| 3 | 4 | 4 | 4 | 0 | 1 | 2 | 3 |
| 4 | 5 | 3 | 3 | 1 | 0 | 1 | 4 |
| 5 | 6 | 4 | 2 | 2 | 1 | 0 | 5 |
| 6 | 1 | 1 | 3 | 3 | 4 | 5 | 0 |

For example, if the pathloss between pico 1 and pico 2 is lower than the threshold, then they can be assumed to suffer severe mutual interference. Thus, pico 1 can use TDD UL/DL configuration 2 to provide DL-heavy resource for DL transmission. Pico 2 may also want to use some DL-heavy configurations to adapt downlink burst data transmission. Thus, if pico 2 has the authority to independently select its own TDD UL/DL configuration, it may select TDD UL/DL configuration 3 or 4, which is also a DL-heavy TDD UL/DL configuration and can provide 70% or 80% resources for downlink. Looking up Table 1, the number of conflicting subframes is 4 or 3 between TDD UL/DL configuration 2 and 3 or 4, respectively. So 40% or 30% of resources of pico 1 and pico 2 may suffer UL-DL interference.

Instead, by using a UL-DL interference coordination scheme, since the pathloss between pico 1 and pico 2 are lower than the threshold, then they are recorded at the macro eNB side. So, both picos may have no authority to determine their own TDD UL/DL configurations autonomously and may need to wait for the decision from macro. Therefore, the macro eNB can select the TDD UL/DL configuration for pico 2 with fewer conflicting subframes with pico 1 cell, according to Table 1. The macro eNB can take into account the reported ratio between downlink and uplink traffic at pico 2. The macro eNB can select TDD UL/DL configuration 2, instead of configuration 3 or 4, for pico 2. Thus, there is no UL-DL interference between pico 1 and pico 2 due to same TDD UL/DL configuration. Accordingly, system performance can benefit from dynamic TDD reconfiguration without UL-DL interference.

Alternatively, a pico eNB without the authority of determining TDD UL/DL configuration can also send its expected TDD UL/DL configuration to macro eNB via X2 interface; then macro eNB selects the TDD UL/DL configuration for pico cell with the less conflicting subframes according to Table 1 and takes the expected TDD UL/DL configuration by this pico into account.

For example, assuming the pathloss between pico 1 and pico 2 is lower than a threshold, then the macro can determine that they suffer severe mutual interference. In a particular example, pico 1 uses TDD UL/DL configuration 5 to provide DL-heaviest resource for DL transmission. Pico 2 may want to use some UL-heavy configurations to adapt uplink burst data transmission. If pico 2 has the authority to independently select its own TDD UL/DL configuration, it may select TDD UL/DL configuration 0, which is the UL-heaviest TDD UL/DL configuration and can provide 60% of resources for uplink. Looking up Table 1, the number of conflicting subframes is 6 between TDD UL/DL configuration 5 and 0. So 60% of resources may suffer UL-DL interference.

Instead, by using UL-DL interference coordination, since the pathloss between pico 1 and pico 2 is lower than the threshold, then they are recorded at the macro eNB side. Therefore, the macro eNB can select the TDD UL/DL configuration for pico 2 with less conflicting subframes with pico 1 cell, according to Table 1 and can take the expected TDD UL/DL configuration 2 of pico 2 into account. For example, macro eNB can select TDD UL/DL configuration 1 for pico 2 which can provide 40% of resources for uplink and the number of conflicting subframes can be 4. Although TDD UL/DL configuration 1 provides less uplink resources than TDD UL/DL configuration 0, there is less UL-DL interference between pico 1 and pico 2. Thus, system performance can still benefit from dynamic TDD reconfiguration with less UL-DL interference.

In addition, based on the inter-cell interference status in the network, the macro eNB may also return the TDD UL/DL configuration of all concerned cells back to the default TDD UL/DL configuration or TDD UL/DL balanced configuration, such as, for example, configuration 1. Thus the macro eNB's selection may provide less gain from dynamic TDD UL/DL configuration but the overall network performance can still be improved.

In another example, pico 1 may be near pico 2. However, pico 1 may be dominated with UL-heavy traffic, while pico 2 may be dominated with the DL-heavy traffic. Thus it may be difficult to find a suitable TDD UL/DL configuration for pico 1 to avoid interference with pico 2. Another way to handle the system is to adjust pico 1's TDD UL/DL configuration as well as pico 2's, or towards the TDD UL/DL balanced configuration, for example, configuration 1. Thus, both pico cells can have less interference and network performance may be improved.

After the TDD UL/DL configuration for pico cell is determined, the macro eNB can send it to the pico eNB via X2 or S1. Then, the pico can change its TDD UL/DL configuration, complying with the macro eNB's decision.

If the macro and pico operate on the same carrier, co-channel interference may result. Therefore, each associated pico cells within macro's coverage may receive co-channel interference with macro.

In this case, the coordinated UL-DL interference mitigation approach can be as follows. First, the macro eNB can send its TDD UL/DL configuration to each pico eNB within its coverage via X2 or any other suitable interface. Each pico eNB can then implement Table 1 in its memory and can estimate the pathloss to macro eNB by listening to a reference signal of macro eNB. If Pathloss is greater than a threshold plus some margin, a pica eNB can select the TDD UL/DL configuration according to its own traffic variation in UL and DL. Otherwise, the pico eNB can select a TDD UL/DL configuration with fewer conflicting subframes than the optimal configuration based on its own traffic variation, based on the macro cell's TDD UL/DL configuration according to Table 1.

In certain embodiments, signaling via X2 or SI may be explicitly specified for a macro cell to collect the pathloss information between the associated pico cells, for the macro cell to instruct the pico cell for TDD UL/DL configuration, or for a pico cell to propose a TDD UL/DL configuration change for the macro cell decision.

Figure 3:
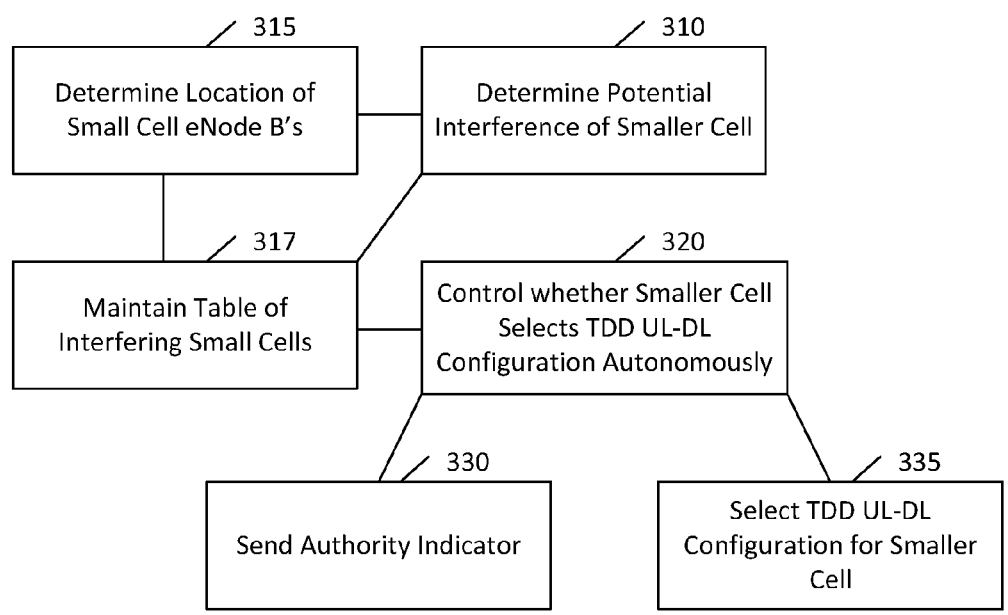
FIG. 3 illustrates a method according to certain embodiments.

FIG. 3 illustrates a method according to certain embodiments. The method of FIG. 3 can be performed by, for example, an eNode B of a macro cell. As shown in FIG. 3, the method can include, at 310, determining potential interference of a smaller cell in a network including the smaller cell and a larger cell. The smaller cell and the larger cell here are simply two examples of different cells that can exist in a network such as a heterogeneous network. Thus, a smaller cell can be an example of a first cell and a larger call can be an example of a second cell. Determining potential interference can include determining path loss. Determining potential interference can include determining whether an inter-cell interference between two smaller cells exceeds a threshold for at least one of the cells. The method can also include, at 315, determining a location of each associated smaller cell within a coverage of a larger cell, wherein the determining potential interference is based on the location. Moreover, the method can include, at 317, maintaining a table of interfering smaller cells, wherein the determining potential interference is based on the table. The table can be maintained by, for example, calculating pathloss based on the location determined at 315.

The method can also include, at 320, controlling whether the smaller cell is autonomously selects a time division duplex uplink-downlink configuration, based on the potential interference determined. The controlling can be based on determining that no other smaller cell is recorded in a portion of a table corresponding to the smaller cell. The controlling can include returning the smaller cell to at least one of a default time division duplex uplink-downlink configuration or a balanced time division duplex uplink-downlink configuration based on a determined inter-cell interference status of the network.

The method can further include, at 330, sending an authority indicator to a base station of the smaller cell when it is determined that the smaller cell is to autonomously select the configuration. There is no requirement that the smaller cell have only one base station, or that the base station have only one smaller cell. The sending the authority indication can include sending the authority indication via at least one of an X2 interface or an S1 interface. When sending a negative authority indication, the sending of the authority indicator can be accompanied by sending the configuration to the smaller cell.

The method can additionally include, at 335, selecting the configuration for the smaller cell, when it is determined that the smaller cell is not to autonomously select the configuration. The selection can be based on traffic load information of the smaller cell. Moreover, the selection can be based on an expected configuration of the smaller cell, received from the smaller cell. The selecting can include selecting a time division duplex configuration with fewer conflicting subframes with an interfered cell than a configuration that most closely matches an uplink-downlink load of the smaller cell.

Figure 4:
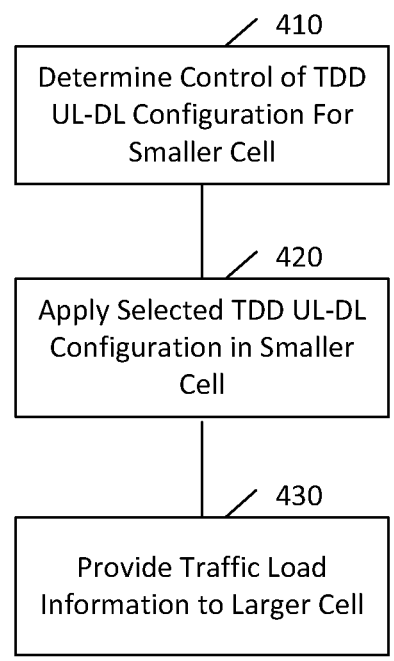
FIG. 4 illustrates another method according to certain embodiments.

FIG. 4 illustrates another method according to certain embodiments. The method of FIG. 4 may be performed by, for example, an access point of a pico cell. As shown in FIG. 4, the method can include, at 410, determining based on information from a base station of a larger cell, whether a smaller cell is to control a time division duplex uplink-downlink configuration. The method can also include, at 420, applying a selected time division duplex uplink-downlink configuration based on the information.

The method can also include, at 430, providing traffic load information to the base station when the smaller cell is not to control the configuration. The traffic load information can include at least one of an instantaneous traffic ratio between downlink and uplink, an amount of data available waiting for scheduling in downlink and uplink, or a traffic ratio during predefined statistic time scale. This traffic load information can be sent periodically or based on triggering.

Figure 5:
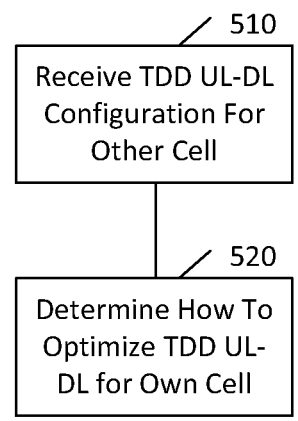
FIG. 5 illustrates a further method according to certain embodiments.

FIG. 5 illustrates further method according to certain embodiments. The method of FIG. 5 may be performed by, for example, an eNode B of a pico cell. As shown in FIG. 5, a method can include, at 510, receiving a time division duplex uplink-downlink configuration from a second cell at a first cell. The method can also include, at 520, determining whether to optimize a time division duplex uplink-downlink configuration of the first cell for an expected load or to avoid interference, based on potential interference with the second cell.

Figure 6:
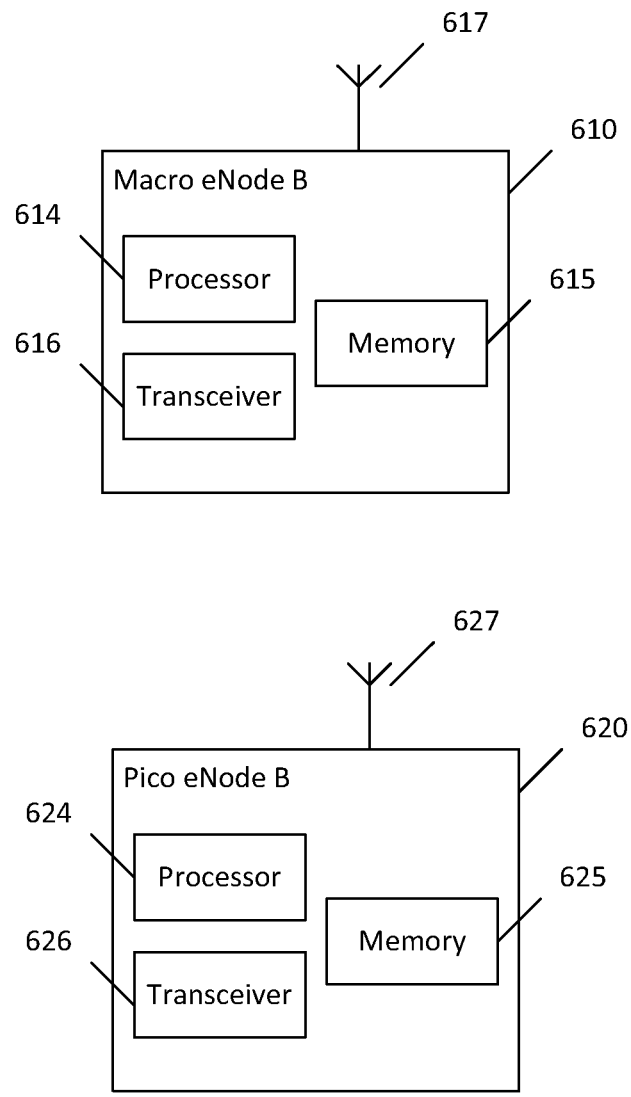
FIG. 6 illustrates a system according to certain embodiments.

FIG. 6 illustrates a system according to certain embodiments of the invention. In one embodiment, a system may include two devices, such as, for example, macro eNB 610 and pico eNB 620. Each of these devices may include at least one processor, respectively indicated as 614 and 624. At least one memory is provided in each device, and indicated as 615 and 625, respectively. The memory may include computer program instructions or computer code contained therein. Transceivers 616 and 626 are provided, and each device may also include an antenna, respectively illustrated as 617 and 627. Other configurations of these devices, for example, may be provided. For example, macro eNB 610 and pico eNB 620 may be configured for wired communication, rather than wireless communication, and in such a case antennas 617 and 627 would illustrate any form of communication hardware, without requiring a conventional antenna.

Transceivers 616 and 626 can each, independently, be a transmitter, a receiver, or both a transmitter and a receiver, or a unit or device that is configured both for transmission and reception.

Processors 614 and 624 can be embodied by any computational or data processing device, such as a central processing unit (CPU), application specific integrated circuit (ASIC), or comparable device. The processors can be implemented as a single controller, or a plurality of controllers or processors.

Memories 615 and 625 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate therefrom. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as macro eNB 610 and pico eNB 620, to perform any of the processes described above (see, for example, FIGS. 3-5). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 6 illustrates a system including a macro eNB and a pico eNB, embodiments of the invention may be applicable to other configurations, and configurations involving additional elements, as illustrated herein. For example, other kinds of heterogeneous networks and network elements can be used.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method comprising:
   determining, by a base station of a first cell based on information from a base station of a second cell, whether the base station of the first cell is to control a time division duplex uplink-downlink configuration;
   applying, by the base station of the first cell, a selected time division duplex uplink-downlink configuration based on the information; and
   providing, by the base station of the first cell, at least one of traffic load information and current and intended/suggested time division duplex uplink-downlink configuration to the base station of the second cell when the base station of the first cell is not to control the configuration.

2. The method of claim 1, wherein the traffic load information comprises at least one of an instantaneous traffic ratio between downlink and uplink, an amount of data available waiting for scheduling in downlink and uplink, or a traffic ratio during predefined statistic time scale.

3. The method of claim 1, wherein the providing the traffic load information comprises sending the traffic load information periodically or based on triggering.

4. A base station of a first cell, the base station comprising:
   at least one processor; and
   at least one memory including computer program code,
   wherein the at least one memory and the computer program code are configured to, with the at least one processor, cause the base station of the first cell at least to
   determine, based on information from a base station of a second cell, whether the base station of the first cell is to control a time division duplex uplink-downlink configuration;
   apply a selected time division duplex uplink-downlink configuration based on the information; and
   provide at least one of traffic load information and current and intended/suggested time division duplex uplink-downlink configuration to the base station of the second cell when the base station of the first cell is not to control the configuration.

5. The base station of claim 4, wherein the traffic load information comprises at least one of an instantaneous traffic ratio between downlink and uplink, an amount of data available waiting for scheduling in downlink and uplink, or a traffic ratio during predefined statistic time scale.

6. The base station of claim 4, wherein the at least one memory and the computer program code are configured to, with the at least one processor, caused the apparatus at least to provide the traffic load information by sending the traffic load information periodically or based on triggering.

* * * * *